Patented Nov. 27, 1945

2,390,028

UNITED STATES PATENT OFFICE 2,390,028

PREPARATION OF ACRYLIC ESTERS

Harry T. Neher and Stanton C. Kelton, Jr., Bristol, Pa., assignors to Röhm & Haas Company, Philadelphia, Pa., a corporation of Delaware No Drawing. Application November 23, 1943, Serial No. 511,478

8 Claims. (Cl. 260—486)

This invention relates to a method for preparing esters of acrylic acid from esters of bis-(2-carboxyethyl) ethers having the formula $$X(CH_2CH_2COOR)_2,$$

wherein R is the non-hydroxylated residue of a primary aliphatic alcohol having from one to about eighteen carbon atoms which may be either straight or branched chain, saturated or unsaturated, and X is oxygen or sulfur.

Certain ethers of the type from which esters of acrylic acid are formed in accordance with the present invention, as well as a method for preparing such ethers, are disclosed and claimed in copending application Serial No. 439,079, filed April 15, 1942.

In accordance with the present invention, esters of acrylic acid are prepared by catalytically cleaving ethers as above noted to effect a splitting of same into two molecules of the corresponding acrylic ester and one molecule of water.

Catalysts suitable for use in effecting such cleavage include sulfuric acid, sulfonic acids, such as benzene sulfonic acid, p-toluene sulfonic acid, phenol-sulfonic acids, and naphthalene mono- or di-sulfonic acids, boron trifluoride or its strongly acidic coordination compounds, including such complexes as methoxy fluoboric acid ($CH_3OH \cdot BF_3$), boron trifluoride ethyl ethers, boron trifluoride isopropyl ether, boron trifluoride butyl ethers, and acetoxy fluoboric acid (($CH_3COOH)_2 \cdot BF_3$), and mixtures of two or more of them.

The reaction herein disclosed and claimed may be employed in the preparation of acrylate esters of saturated or unsaturated primary alcohols having from one to about eighteen carbon atoms, such as methyl, ethyl, chloroethyl, propyl, butyl, normal amyl, isoamyl, ethoxyethyl, ethoxyethoxyethyl, 2-ethyl hexyl, lauryl, and allyl. It is not confined to the preparation of esters of alcohols which contain only carbon and hydrogen, as is evidenced by the fact that it may be employed in the preparation of methoxy-ethyl acrylate, ethoxyethyl acrylate, and butoxyethyl acrylate.

The time, temperature and pressure employed in carrying out the catalytic cleavage of the ethers aforesaid, in accordance with this invention, may be varied within relatively wide ranges, depending upon such factors as the boiling points of the starting materials, the ultimate products, and the particular catalyst used. Specific times, temperatures, and pressures are given in the examples noted below. However, it is to be understood that they are given by way of illustration and not by way of limitation.

The following examples are given to illustrate more clearly the specific embodiments within the scope of this invention:

Example 1

Sixty-gram (0.22 mol) portions of the compound, $C_4H_9OOCC_2H_4OC_2H_4COOC_4H_9$, were placed in a small Claisen flask connected to a condenser and receiver. To each separate portion there was added a small amount of different acid catalysts. There was also added a small amount of β-naphthol to inhibit polymerization. The pressure in the apparatus was reduced to 30 to 50 mm. and the reaction mixture was heated at temperatures from 100° C. to over 200° C. The vapor temperatures were found in all cases to correspond to the boiling point of butyl acrylate under the pressure of the system, e. g. 69° C./50 mm. or 64° C./40 mm., which is markedly lower than the boiling point of the saturated dibutyl-ester (150°–160° C./4 mm.).

(a) For one portion, there was used 3.6 grams of 95% sulfuric acid as a catalyst. The reaction mixture was gradually heated from 100° C. to 180° C. during the course of five hours and then maintained at 200°–210° C. for three fourths of an hour. There was obtained a condensate of 51 grams, containing by analysis 66% of butyl acrylate in a yield of 60%.

(b) For a second portion, three grams of p-toluene sulfonic acid was used as the catalyst. The reaction mixture was heated at 170°–183° C. for two hours and then at 200° C. for an additional two hours at a pressure of about 40 mm. There was collected 22 grams of a distillate which, from saponification number, acid number, and ester number, contained 68% of butyl acrylate.

(c) To yet a third portion of the above dibutyl ester, there was added three grams of zinc chloride. The reaction mixture was heated gradually up to 190° C. and held at 190° C.–203° C. for three and a half hours. A condensate of 18 grams was obtained, consisting mainly of butyl acrylate.

Example 2

In a series of preparations with sulfuric acid as a catalyst, esters of dicarboxydiethyl ether, $O(C_2H_4COOR)_2$, where R was methyl, butyl, isoamyl, ethoxyethyl, 2-ethyl hexyl, and lauryl, were decomposed to the corresponding esters of acrylic acid. The acid was mixed with the ester of dicarboxydiethyl ether in amount of 11 mol per cent. of the respective diesters along with an inhibitor for polymerization. On a weight basis, therefore, the amount of 98% sulfuric acid used varied from 6.4 grams for 100 grams of the dimethyl ester to 2.4 grams for the didodecyl ester. The temperatures of the reaction mixtures were maintained in general between 180° C. and 200° C. except in the case of the didodecyl ester, in the case of which the temperature was carried to over 300° C. The yields of the corresponding esters of acrylic acid varied from about 60% to 70% except in the case of the dodecyl acrylate, where, with the high temperatures required, the yield was 43%. There was also recovered acrylic acid in yields varying from 7% to 20% in the different preparations.

Example 3

A mixture of 100 grams of di-(β-carbomethoxyethyl) ether, 3.5 milliliters of 98% $H_2SO_4$, and a trace of hydroquinone was added over a seven-hour period to a small Claisen flask heated by an oil bath to 180°–200° C. The flask was held under a slightly reduced pressure (690 mm.). The methyl acrylate distilled as it was formed into a well-cooled receiver. The crude material collected weighed 78 grams, had a saponification number of 568, an acid number of 53, ester number of 515, purity of 78.7%, and a yield of 67.8%. Fifty per cent (39 grams) of this material was redistilled to collect the material boiling up to and including the boiling point of methyl acrylate—that is, up to 82° at atmospheric pressure. The distillate weighed 34 grams. Analysis of this distillate showed a saponification number of 572, an acid number of 3.7, an ester number of 568, a purity of 87%, and a yield of 65.5%. During the first distillation, eight grams of methyl acrylate polymer was collected. This material was insoluble in water and dilute alkali. The yield of methyl acrylate, including this polymer, was 65.5%+8.8%=74.3%. A portion of the redistilled material was neutralized with sodium bicarbonate to remove traces of acrylic acid. After washing and drying, the material polymerized readily when warmed with benzoyl peroxide.

Example 4

Di-(β-carbobutoxyethyl)ether (100 grams) was mixed with 2.4 milliliters of 98% sulfuric acid and a trace of tannic acid. The mixture was then added over an eighteen-hour period to a small Claisen flask heated to 180°–193° C. and under a diminished pressure of 31–33 mm. The crude butyl acrylate solution weighed 80 grams, had a saponification number of 416, an acid number of 105, an ester number of 311, and a composition of 70.9% ester and 13.5% acrylic acid. The ester yield amounted to 60.5%. When this material was redistilled, the portion boiling up to 146° at atmospheric pressure had a saponification number of 402, an acid number of 104, an ester number of 298, a composition of 67.9% ester and 13.4% acid. A sample of this distillate was washed with water and sodium bicarbonate solution until free of acrylic acid. A portion of this material polymerized readily when heated with benzoyl peroxide to give a water-white polymer of the acrylic type.

Example 5

Iso-amyl acrylate was prepared by decomposing the diester, $O(C_2H_4COOCH_2CT_2CH(CH_3)_2)_2$, (100 grams). Sulfuric acid was used to catalyze the cleavage reaction and a trace of β-naphthol was added to inhibit polymerization of the product. The decomposition was carried out in the apparatus used for the methyl and butyl esters. Five and one-half hours at 178°–96° C. and 20–22 mm. were sufficient for the addition and decomposition. The acrylic ester passed out of the flask at 75°–108° C. as it was formed. It weighed 83.5 grams, had a saponification number of 397, an acid number of 85, an ester number of 312, a composition of 78.9% ester and 10.9% acid, and a yield of 70.0% ester and 19.1% acid. This distillate was redistilled, with collection of the material which boiled at 40°–86° C./41 mm. (Eighty per cent boiled at 70°–76° C./41 mm.) Analysis of this material gave the following results: Saponification number 388, acid number 97, ester number 291; composition 73.6% ester, 12.5% acid. A sample of this material, when washed free of acrylic acid and dried, polymerized readily when it was heated with benzoyl peroxide.

Example 6

One hundred grams of the di-ethoxyethyl ester, $O(C_2H_4COOC_2H_4OC_2H_5)_2$, was subjected to the same "flash distillation" procedure used above for the methyl, butyl, and isoamyl esters. Sulfuric acid (2.2 milliliters) was used to catalyze the cleavage. The reaction proceeded smoothly at 180°–200° C./34–36 mm. over a period of eight hours. The distillate which passed over at 60°–100° C. weighed 76 grams and had a saponification number of 345, an acid number of 74, an ester number of 271. The distillate had a composition of 69.5% ester and 9.5% acid. The yield of ester was, therefore, 56% and of acid 15%. A water-white solid polymer formed when this material was neutralized, dried, and then polymerized by heating with benzoyl peroxide.

Example 7

One hundred grams of the 2-ethyl hexyl diester of di-(β-carboxyethyl) ether was converted to 2-ethyl hexyl acrylate by flash distillation at 189°–205° C./32–34 mm. Concentrated sulfuric acid (1.7 milliliters) was used to catalyze the cleavage reaction, and a trace of hydroquinone was again employed. The distillate, which had a boiling point of 90°–107° C./32–34 mm., weighed 92 grams. After being dried with sodium sulfate, it weighed 88 grams. It had the following properties: Saponification number 289, acid number 76, ester number 213; composition, 69.8% ester, 9.7% acid. This corresponds to a yield of ester of 63.5% and of acid of 23%. Redistillation of this crude distillate gave material boiling at 104°–109° C./24 mm. which had the following properties: Saponification number 307, acid number 72, and ester number 235, corresponding to a composition of 77% of ester and 9.3% of acid. A dry, neutral sample of this material polymerized readily when warmed with benzoyl peroxide.

Example 8

A mixture of 100 grams of $O(C_2H_4COOC_{12}H_{25})_2$, 1.3 milliliters of 98% sulfuric acid, and a trace of β-naphthol was flash-distilled in the manner used for the other esters described above. With this high molecular weight ester, it was necessary to use a much higher decomposition temperature. The diester decomposed slowly at the reaction temperature used of 288°–310° C./21 mm., but was stable at 180°–200° C. The crude distillate weighed 65 grams, had a saponification number of 185, an acid number of 35, and an ester number of 150, and was composed of 64% ester and 4.5% acid. This corresponds to a yield of ester of 43.2% and of acid of 10%. A neutralized dry sample of this ester polymerized readily when heated with benzoyl peroxide.

*Example 9*

A mixture of 100 grams (0.333 mol) of diisoamyl ester of di-(β-carboxyethyl) ether, 8.4 grams (25 grams/mol ester) of (C₂H₅)₂O.BF₃ catalyst, and one gram of β-naphthol was added dropwise to a distilling flask heated by an oil bath at 200-210° C. under a pressure of 35 mm. over a period of fourteen hours. There were obtained 21 grams of distillate having a saponification number of 537.7 and an acid number of 184, corresponding to an isoamyl acrylate of 89.6% purity.

*Example 10*

Sixty grams of the diester

O(C₂H₄COOCH₂CH=CH₂)₂ was mixed with 1.5 cc. of 98% sulfuric acid and a trace of hydroquinone. The mixture was flash-distilled at 180°-190° C./35 mm. Eight grams of crude product passed over at a vapor temperature of about 48° C. Analysis of the distillate gave a saponification number of 432, an acid number of 164, and an ester number of 268, which indicated a composition of 53.5% allyl acrylate.

The decomposition of dicarboxydiethyl ethers by heating in the presence of an acid catalyst permits the preparation of individual esters of acrylic acid which polymerize readily. The reaction involves cleavage with dehydration. It is advantageous to work under conditions of reduced pressure to minimize the losses of ester by hydrolysis. If desired, the reaction may be carried out in the presence of an inert volatile liquid which will help sweep out the water as formed. The method is readily applicable to the cleavage and dehydration of diesters of the formula

O(CH₂CH₂COOR′)₂ where R′ is the hydrocarbon residue of primary aliphatic alcohols of one to twelve carbon atoms, although esters of higher alcohols may be used by working at lower pressures. The method here disclosed is particularly advantageous in the preparation of acrylic esters in which the alcohol residue contains more than three carbon atoms, since by the methods of the prior art esters of such alcohols are obtained as a mixture of products from transesterification or are purified only with great difficulty inasmuch as common methods are prone to give mixtures of esters and ethers which are not readily separable.

We claim:

1. A method for preparing an ester of acrylic acid from a diester of the formula

O(CH₂CH₂COOR′)₂ wherein R′ represents an acyclic group containing one to eighteen carbon atoms from the class consisting of alkyl, halogenated alkyl, and alkoxy alkyl groups, which comprises cleaving said diester and eliminating water therefrom by heating in the presence of an acid catalyst and an inhibitor for preventing the polymerizing of acrylates.

2. A method for preparing an ester of acrylic acid from a diester of the formula

O(CH₂CH₂COOR′)₂ wherein R′ represents an acyclic group of one to twelve carbon atoms from the class consisting of alkyl, halogenated alkyl, and alkoxy alkyl groups, which comprises cleaving said diester and eliminating water therefrom by heating in the presence of an acid catalyst and an inhibitor for preventing the polymerizing of acrylates.

3. A method for preparing an ester of acrylic acid from a diester of the formula

O(CH₂CH₂COOR′)₂ wherein R′ represents an acyclic group of one to twelve carbon atoms from the class consisting of alkyl, halogenated alkyl, and alkoxy alkyl groups, which comprises cleaving said diester and eliminating water therefrom by heating in the presence of a small amount of strong sulfuric acid and an inhibitor for preventing the polymerizing of acrylates.

4. A method for preparing butyl acrylate from the diester

C₄H₉OOCCH₂CH₂OCH₂CH₂COOC₄H₉ which comprises cleaving said diester and eliminating water therefrom by heating in the presence of an acid catalyst and an inhibitor for preventing the polymerizing of acrylates.

5. A method for preparing isoamyl acrylate from the diester iso-C₅H₁₁OOCCH₂CH₂OCH₂CH₂COOC₅H₁₁-iso which comprises cleaving said diester and eliminating water therefrom by heating in the presence of an acid catalyst and an inhibitor for preventing the polymerizing of acrylates.

6. A method for preparing 2-ethyl hexyl acrylate from the diester $$\underset{\substack{|\\C_2H_5}}{C_4H_9-CH-CH_2OOCCH_2CH_2OCH_2CH_2COOCH_2}\underset{\substack{|\\C_2H_5}}{CH-C_4H_9}$$

which comprises cleaving said diester and eliminating water therefrom by heating in the presence of an acid catalyst and an inhibitor for preventing the polymerizing of acrylates.

7. A method for preparing an ester of acrylic acid from a diester of the formula

O(CH₂CH₂COOR)₂ wherein R is an alkyl group containing one to eighteen carbon atoms, which comprises cleaving said diester and eliminating water therefrom by heating in the presence of an acid catalyst.

8. A method for preparing an ester of acrylic acid from a diester of the formula

O(CH₂CH₂COOR)₂ wherein R is an alkoxyalkyl group containing one to eighteen carbon atoms, which comprises cleaving said diester and eliminating water therefrom by heating in the presence of an acid catalyst and an inhibitor for preventing the polymerization of acrylates.

HARRY T. NEHER.
STANTON C. KELTON, Jr.